W. V. TURNER.
FLUID PRESSURE BRAKE DEVICE.
APPLICATION FILED MAY 9, 1911.
1,078,018.
Patented Nov. 11, 1913.
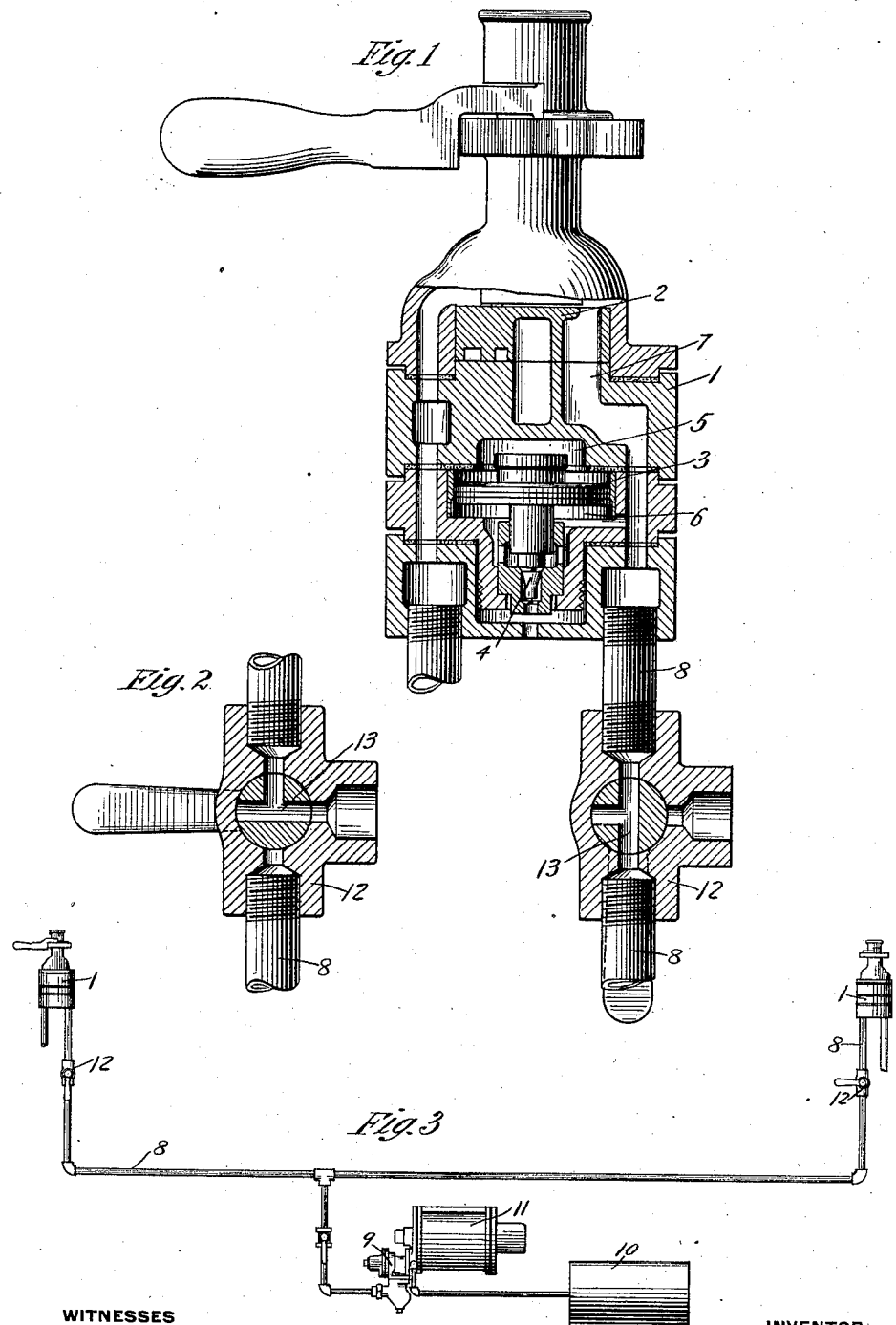

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE-BRAKE DEVICE.

1,078,018.

Specification of Letters Patent.    Patented Nov. 11, 1913.

Application filed May 9, 1911.   Serial No. 626,105.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure-Brake Devices, of which the following is a specification.

This invention relates to fluid pressure brakes, and more particularly to a brake equipment for vehicles designed to run in either direction and provided with two brake valves arranged at opposite ends of the vehicle, so that the brakes may be controlled from either end, as desired.

Where a brake valve is employed of the type having an equalizing piston and train pipe discharge valve operated by said piston, the piston being subject to the opposing pressures of an equalizing reservoir and train pipe, when a reduction in train pipe pressure is made by one brake valve to effect an application of the brakes, fluid under pressure in the equalizing reservoir of the other brake valve is apt to leak past the equalizing piston to the train pipe and thereby reduce the pressure in the equalizing reservoir. This reduction in pressure will not have any effect while making a reduction in train pipe pressure, but upon increasing the train pipe pressure by manipulation of one brake valve to release the brakes, the higher train pipe pressure is then liable to move the equalizing piston of the other brake valve and thereby open the equalizing discharge valve to vent fluid from the train pipe. In this way considerable air is wasted and the release of the brakes is also delayed. In order to obviate the above difficulty, it is customary to provide a cut out cock in the branch pipe connecting each brake valve with the train pipe, so that the train pipe may be cut off from the brake valve not in use. In service, it sometimes happens that the engineer neglects to cut out the brake valve in going to the opposite end of the vehicle, or neglects to cut in the brake valve which he desires to use and consequently when he desires to apply the brakes he finds that he is unable to do so.

The principal object of my invention is to provide means for warning or indicating to the engineer whenever the brake valve is cut off from the train pipe.

In the accompanying drawing, Figure 1 is a central sectional view of an engineer's brake valve with my improvement applied thereto, showing the cut-out cock in its open position; Fig. 2 a detail sectional view of the cut-out cock in its closed position; and Fig. 3 a diagrammatic view of a car air brake equipment, illustrating an application of my invention.

The usual standard engineer's brake valve is shown in Fig. 1 of the drawing and comprises a casing 1 containing rotary valve 2 and having a piston chamber containing an equalizing piston 3 for operating an equalizing discharge valve 4. The chamber 5 on one side of piston 3 is subject to the pressure of an equalizing reservoir and chamber 6 on the opposite side of said piston is open to the train pipe. A passage 7 leading from the seat of the rotary valve 2 is connected with the train pipe 8.

As shown in Fig. 3, a brake valve may be provided at opposite ends of the vehicle and the train pipe 8 may be connected to a triple valve device 9 adapted to supply fluid from the auxiliary reservoir 10 to the brake cylinder 11 in the usual manner, upon a reduction in train pipe pressure.

According to my improvement, a cock 12 is inserted in the train pipe branch pipe below the brake valve, said cock having a three-way port 13 adapted in one position of the cock to open communication from the brake valve to the train pipe and in another position, as shown in Fig. 2, to connect the brake valve side of the train pipe with the atmosphere.

On the end of the car from which the brakes are to be controlled, the handle of the cock 12 is turned to open position as shown in Fig. 1 and on the opposite end of the car, the handle is turned to closed position, as shown in Fig. 2. It will thus be seen that the brake valve on the end of the car which is not occupied is cut out and does not interfere with the control of the brakes by manipulation of the other brake valve. When the engineer or motorman desires to operate the brakes from the opposite end of the car, the cock 12 is turned to closed position and the cock 12 at the opposite end of the car is turned to open position. If the engineer should neglect to turn the cock to the open position, then as soon as he turns the brake valve to the usual running position, air is supplied to the train pipe, but the cock 12 being in its closed position, air escapes at the exhaust port of the cock and thereby warns the engineer that the cock is in closed position, so that he will then turn the cock to its open position before starting.

Having now described my invention, what I claim as new and desire to secure by Letters Patent, is:—

1. In a fluid pressure brake, the combination with a train pipe and a brake valve for supplying air to the train pipe, of a cock in the train pipe connection to the brake valve having ports for establishing communication from the brake valve to the train pipe in one position and adapted to cut off the train pipe from the brake valve in another position and connect the brake valve side of the train pipe with the atmosphere.

2. In a fluid pressure brake, the combination with a train pipe and a branch pipe, of a brake valve for supplying fluid through the branch pipe to the train pipe and provided with an equalizing discharge valve, and a cock in said branch pipe having an open position for connecting the brake valve with the train pipe and a closed position in which the train pipe is cut off and the brake valve side of the train pipe is connected to the atmosphere.

3. In a fluid pressure brake, the combination with a train pipe and a branch pipe, of a brake valve having a running position for supplying fluid through the branch pipe to the train pipe and a cock in said branch pipe having an open position for connecting the brake valve to the train pipe and a closed position in which the train pipe is cut off and the brake valve side of the train pipe is connected to the atmosphere.

In testimony whereof I have hereunto set my hand.

WALTER V. TURNER.

Witnesses:
A. M. CLEMENTS,
W. W. MARTIN.

---

Copies of this patent may be obtained for five cents each, by addressing the "Commissioner of Patents, Washington, D. C."